United States Patent
Seto et al.

(10) Patent No.: US 11,340,125 B2
(45) Date of Patent: May 24, 2022

(54) PRESSURE SENSOR WITH IMPROVED MEASUREMENT ACCURACY

(71) Applicant: Azbil Corporation, Tokyo (JP)

(72) Inventors: Yuki Seto, Tokyo (JP); Rina Ogasawara, Tokyo (JP); Yusuke Niimura, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 0 days.

(21) Appl. No.: 17/169,885

(22) Filed: Feb. 8, 2021

(65) Prior Publication Data
US 2021/0255047 A1 Aug. 19, 2021

(30) Foreign Application Priority Data
Feb. 19, 2020 (JP) .............................. JP2020-026177

(51) Int. Cl.
*G01L 9/00* (2006.01)
*G01L 7/08* (2006.01)

(52) U.S. Cl.
CPC ............ *G01L 7/082* (2013.01); *G01L 9/0041* (2013.01)

(58) Field of Classification Search
None
See application file for complete search history.

(56) References Cited

U.S. PATENT DOCUMENTS

2013/0278937 A1* 10/2013 Degertekin ............ G01Q 60/38
356/501
2019/0003910 A1* 1/2019 Seto ....................... G01L 9/0054

FOREIGN PATENT DOCUMENTS

JP 2017-120214 A 7/2017

* cited by examiner

*Primary Examiner* — Lisa M Caputo
*Assistant Examiner* — Nigel H Plumb

(57) ABSTRACT

To provide a pressure sensor that has high pressure resistance performance, small measurement error by suppressing hysteresis with respect to pressure, and high sensitivity and high productivity, a pressure sensor includes a diaphragm unit with a first main surface that receives a measurement target fluid's pressure and a second main surface located on the opposite side of this first main surface, a housing, and a sensing unit that outputs the diaphragm unit's deformation as an electric signal, in which at least part of the diaphragm unit has a multi-layer structure in which a plurality of thin plate members are stacked, and the plurality of thin plate members are deformed independently of each other while at least part of the plurality of thin plate members is in press-contact to each other in a pressure receiving state in which the measurement target fluid's pressure is applied to the first main surface.

20 Claims, 5 Drawing Sheets

PRESSURE SENSOR WITH IMPROVED MEASUREMENT ACCURACY

CROSS REFERENCE TO RELATED APPLICATIONS

This patent application claims the benefit of foreign priority to Japanese Patent Application No. JP 2020-026177 filed on Feb. 19, 2020, the disclosure of which is hereby incorporated by reference in its entirety.

BACKGROUND OF THE INVENTION

The present disclosure relates to a pressure sensor that detects the pressure of a fluid or the like and, more particularly, to a pressure sensor for sanitary usage.

Of pressure sensors that detect the pressure of a fluid, pressure sensors for sanitary usage used at manufacturing sites in fields of food and pharmaceuticals need hygienic consideration, so stringent requirements are imposed on corrosion resistance, cleanliness, reliability, versatility, and the like. These demands have become even more stringent in recent years when laws and regulations regarding hygiene management have been tightened.

Under the circumstances surrounding such pressure sensors for sanitary usage, to meet, for example, requirements of corrosion resistance, materials with high corrosion resistance such as stainless steel (SUS), ceramics, and titanium are used for the portion in contact with the fluid (for example, liquid) for which the pressure is measured. In addition, to meet requirements of cleanliness, a flash diaphragm structure that is easy to clean is adopted and design with high heat and shock resistance is used to support steam cleaning. In addition, to meet reliability requirements, a structure (so-called oil-free structure) that does not use an encapsulant (for example, oil as an incompressible fluid) and a structure (barrier high rigidity) in which the diaphragm is not broken easily are adopted.

As described above, the materials and structures used for pressure sensors for sanitary usage are limited as compared with other pressure sensors. Accordingly, it is not easy to meet all performance requirements for such pressure sensors at a high level. For example, a high-strength and high-rigidity diaphragm with a larger film thickness (with a small aspect ratio of the diameter to the thickness) is needed to obtain a high pressure capacity and suppress measurement error by reducing hysteresis with respect to pressure. In contrast, a low-rigidity diaphragm that deforms significantly with small pressure fluctuations is needed to improve the sensor sensitivity. As described above, the demands for the rigidity of a diaphragm depend on the performance requirements, and these different demands are contradictory to each other (in particular, the suppression of measurement error by reduction in hysteresis is contradictory to the improvement of the sensor sensitivity). Under conditions where the demands contradictory to the mechanical properties of the diaphragm and the design restrictions described above are imposed, for example, a high-strength and high-rigidity diaphragm is first adopted and technical measures for improving the sensor sensitivity are taken.

For example, the patent literature 1 describes a pressure sensor (100) in which three support members (2a, 2b, and 2c) that stand substantially vertically on a support surface (3B) of a diaphragm (3) are erected in predetermined positions and a semiconductor chip is placed on top of these support members. In this pressure sensor (100), a minute deflection of the diaphragm (3) is efficiently transferred to a sensing unit (semiconductor chip 1) through the three support members (2a, 2b, and 2c), specifically, one support member (2a) disposed at a center (30) of the support surface (3B) and two support members (2b and 2c) disposed point-symmetrically with respect to the center (30) (specifically, the semiconductor chip 1 is configured so as to be significantly distorted as compared with the case in which the semiconductor chip 1 is directly provided on the support surface 3B), thereby enhancing the sensor sensitivity.

CITATION LIST

Patent Literature

[PTL 1] JP-A-2017-120214

BRIEF SUMMARY OF THE INVENTION

In the prior art, as described above, the performance requirements are met by taking the above technical measures (such as the technical measures described in patent literature 1) after accepting the contradictory relationship with the mechanical properties such as the rigidity of the diaphragm. Accordingly, it is technically required to improve (preferably eliminate) the contradictory relationship described above by reviewing, for example, the structure of the diaphragm itself, thereby promoting further improvement of performance in combination with the technical measures described above.

The present disclosure has been developed so as to address the problems described above with an object of providing a pressure sensor that has high pressure resistance performance and small measurement error by suppressing hysteresis with respect to pressure, in which the sensitivity with respect to pressure fluctuations in the fluid (referred to below as a "measurement target fluid") to be measured is improved by reviewing the structure of the diaphragm itself.

To solve the problem described above, a pressure sensor (1A, 1B, 1C, 1D, 1E) according to the present disclosure includes a diaphragm unit having a first main surface that receives a pressure of a measurement target fluid and a second main surface located on an opposite side of the first main surface; a housing that supports the diaphragm unit; and a sensing unit that is provided on the second main surface of the diaphragm unit and outputs deformation of the diaphragm as an electric signal, in which at least part of the diaphragm unit has a multi-layer structure in which a plurality of thin plate members are stacked, and the plurality of thin plate members are deformed independently of each other while at least part of the plurality of thin plate members is in press-contact to each other in a pressure receiving state in which the pressure of the measurement target fluid is applied to the first main surface.

In the pressure sensor described above, outer peripheral edges of the plurality of thin plate members may be supported by the housing or adjacent thin plate members of the thin plate members so that the plurality of thin plate members receive a reaction force caused by the pressure via the outer peripheral edges when the plurality of thin plate members are in the pressure receiving state.

In addition, in the pressure sensor described above, at least part of the plurality of thin plate members may be joined to each other via the outer peripheral edges and at least part of the joined outer peripheral edges (14) may be fixed to the housing.

In addition, a pair of facing surfaces of two adjacent plate members of the plurality of thin plate members may be formed so as to be in contact with each other.

In addition, in the pressure sensor described above, a space may be formed between at least part of adjacent thin plate members of the plurality of thin plate members.

In addition, in the pressure sensor described above, a convex portion (11c, 12c) may be provided on at least one of front and back surfaces of at least part of the plurality of thin plate members.

In addition, in the pressure sensor described above, center portions of the plurality of thin plate members may be joined to each other.

In addition, in the pressure sensor described above, a lubrication member (40, 50) may be provided between two adjacent plate members of the plurality of thin plate members.

In addition, in the pressure sensor described above, the adjacent thin plate members may be made of materials different from each other.

It should be noted here that reference numerals in the drawings corresponding to components of the present disclosure are enclosed in parentheses as one example in the above description.

According to the present disclosure, it is possible to provide a pressure sensor that has a high pressure resistance performance and suppressed measurement error by suppressing hysteresis with respect to pressure, and is highly sensitive to pressure fluctuations in the measurement target fluid.

DETAILED DESCRIPTION OF THE INVENTION

Figure 1:
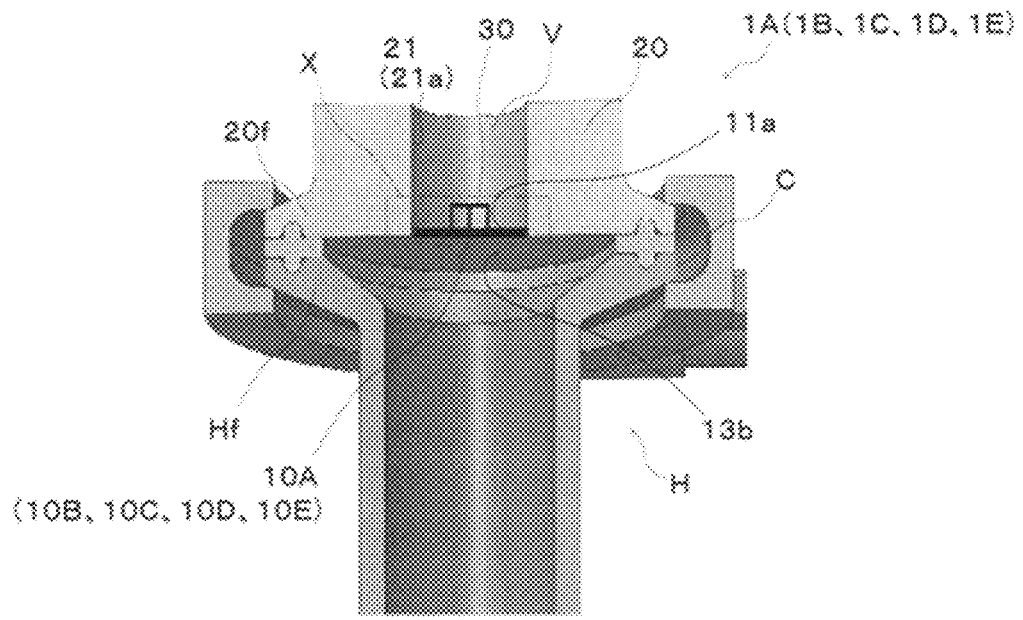
FIG. 1 is a sectional view illustrating a pressure sensor according to an embodiment of the present disclosure and a pipe connected to the pressure sensor.

First to fifth embodiments, which are preferable embodiments of the present disclosure, will be described below with reference to FIG. 1 to FIG. 10. Components common to these embodiments are denoted by the same reference numerals and repeated descriptions will be omitted. It should be noted here that the left-right direction, the front-rear direction, and the up-down direction in the descriptions are defined as the depth direction, the up-down direction, and the left-right direction, respectively, of pressure sensors 1A, 1B, 1C, 1D, and 1E and/or diaphragm units 10A, 10B, 10C, 10D, and 10E illustrated in the individual diagrams with respect to the paper surface. In addition, the individual diagrams are conceptual diagrams and the contents illustrated in the diagrams do not necessarily match the actual pressure sensor.

First Embodiment

Figure 2:
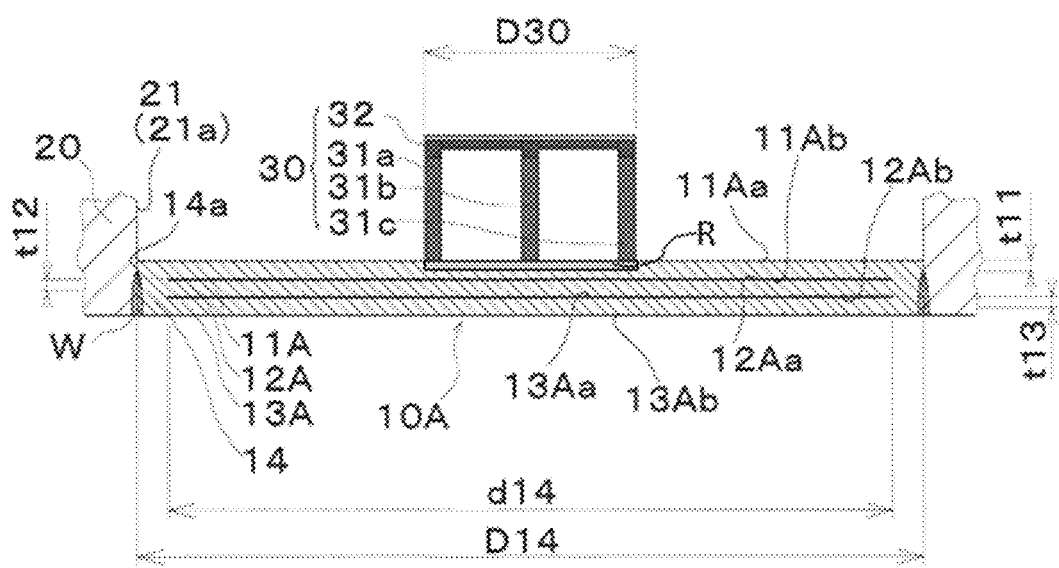
FIG. 2 is an enlarged view illustrating an X portion in FIG. 1 in a cross section of a diaphragm unit included in a pressure sensor according to a first embodiment of the present disclosure.

First, a pressure sensor LA having a diaphragm unit 10A according to a first embodiment of the present disclosure will be described with reference to FIG. 1 and FIG. 2.

[Structure of the Pressure Sensor]

First, the structure of the pressure sensor 1A will be described with reference to FIG. 1 and FIG. 2. As illustrated in FIG. 1, this pressure sensor 1A mainly includes the diaphragm unit 10A that is deformed (deflected) by receiving a pressure P of a measurement target fluid F, a housing 20 that is coupled to the outer peripheral edge of this diaphragm unit 10A and supports the diaphragm unit, and a sensing unit 30 that detects the deformation of the diaphragm unit 10A as a predetermined electric signal (for example, a voltage signal). In addition, below the housing 20, a pipe H through which the measurement target fluid F flows in and out is attached via, for example, a clamp C.

<Diaphragm Unit 10A>

The diaphragm unit 10A is an element including thin film members that change in the deformation amount according to the pressure P of the measurement target fluid F. As illustrated in FIG. 2, the diaphragm unit 10A includes three thin plate members, that is, a first thin plate member 11A, a second thin plate member 12A, and a third thin plate member 13A, and has a multi-layer structure in which these thin film members are stacked.

In the first thin plate member 11A, the second thin plate member 12A, and the third thin plate member 13A, for example, the outer peripheral edges thereof are joined by welding or the like, thereby forming a cylindrical fixing portion 14 at the outer peripheral edge of the diaphragm unit 10A. The fixing portion 14 is joined to the housing 20 (more specifically, an inner peripheral side wall surface 21a of an opening 21 described later) by, for example, welding, thereby supporting and fixing the diaphragm unit 10A via the housing 20. In addition, the inside of the fixing portion 14 forms a deformation region (the deformation region in which the sensing unit 30 is disposed may be particularly referred to as a "deformation detection region R").

The first thin plate member 11A, the second thin plate member 12A, and the third thin plate member 13A are formed by, for example, thin plates that are substantially circular in plan view and have the same plate thickness (a plate thickness t11 of the first thin plate member 11A, a plate thickness t12 of the second thin plate member 12A, and a plate thickness t13 of the third thin plate member 13A). These thin plate members are formed as flat surfaces and each of them has upper and lower (front and back) surfaces. Specifically, the first thin plate member 11A has a first upper surface 11Aa and a first lower surface 11Ab, the second thin plate member 12A has a second upper surface 12Aa and a second lower surface 12Ab, and the third thin plate member 13A has a third upper surface 13Aa and a third lower surface 13Ab. The first upper surface 11Aa that forms the uppermost surface is a portion corresponding to the "second main surface" described in the claims and functions as a support surface on which the sensing unit 30 is placed and held. In addition, the third lower surface 13Ab that forms the lowermost surface is a portion corresponding to the "first main surface" described in the claims and functions as a pressure receiving surface that makes contact with the measurement target fluid F and receives the pressure P.

In the embodiment, two adjacent thin plate members, that is, the first thin plate member 11A and the second thin plate member 12A, and the second thin plate member 12A and the third thin plate member 13A, are in contact with each other. Specifically, even in a non-pressure receiving state, in which the pressure P of the measurement target fluid F is not applied to the diaphragm unit 10A, a pair of facing surfaces, that is, the first lower surface 11Ab and the second upper surface 12Aa, and the second lower surface 12Ab and the third upper surface 13Aa, are in contact with each other. This can prevent a blind zone from being generated.

Here, the pair of facing surfaces may be coated with a material having a small friction coefficient and a small surface free energy, for example, a polymer material such as fluororesin. In specifications with such coating, even in the state (which may be referred to below as a "pressure receiving time" or a "pressure receiving state") in which the pressure P of the measurement target fluid F is applied as, for example, an equivalent distributed load, the pair of facing surfaces can be physicochemically prevented from being crimped. As a result, it is easy to configure the first thin plate member 11A, the second thin plate member 12A, and the third thin plate member 13A so that these thin plate members are deformed independently of each other (it is easy to configure these thin plate members to be slidably moved when different strains are caused between two adjacent thin plate members at a pressure receiving time) while being in press-contact to each other at a pressure receiving time.

In one example, the first thin plate member 11A, the second thin plate member 12A, and the third thin plate member 13A are made of the same material, for example, any one of stainless steel (SUS) and titanium, which have excellent corrosion resistance.

In another example, the first thin plate member 11A, the second thin plate member 12A, and the third thin plate member 13A are made of different materials, for example, either stainless steel (SUS) or titanium. In this case, the materials of two adjacent thin plate members are preferably different. For example, the first thin plate member 11A and the third thin plate member 13A are made of stainless steel (SUS) and the second thin plate member 12A is made of titanium. In such a structure, even if the first thin plate member 11A, the second thin plate member 12A, and the third thin plate member 13A make press-contact to each other at a pressure receiving time, a pair of facing surfaces can be physicochemically prevented from being crimped by the surface free energy. Alternatively, even when different materials are used, the materials may have substantially identical physical property values such as the longitudinal elastic modulus and the thermal expansion coefficient so that the deformation forms of the individual thin plate members are substantially the same.

It should be noted here that the plate thicknesses t11, t12, and t13 of the first thin plate member 11A, the second thin plate member 12A, and the third thin plate member 13A may be different. For example, these plate thicknesses may be different so that the strains (stresses generated on the surfaces) of the surfaces of these thin plate members become identical at a pressure receiving time.

Figure 3:
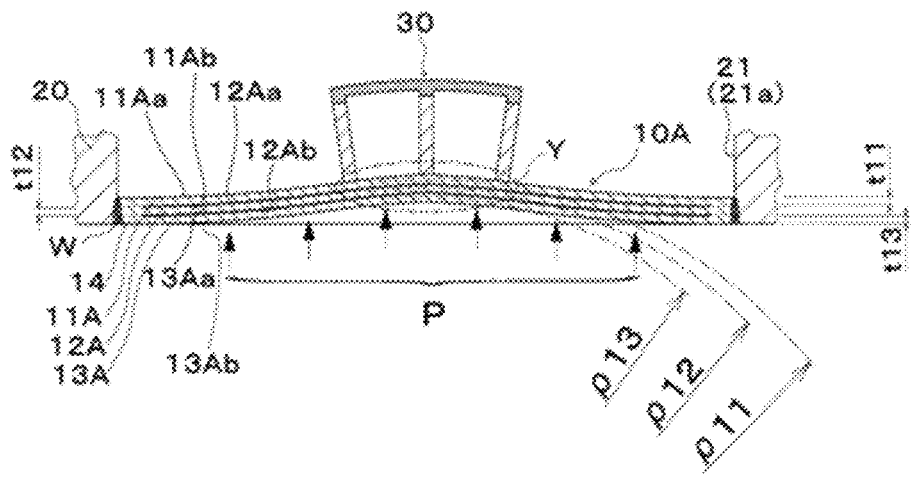
FIG. 3 is a sectional view illustrating the deformation form of the diaphragm unit included in the pressure sensor according to the first embodiment of the present disclosure at a pressure receiving time of the diaphragm unit.
Figure 5:
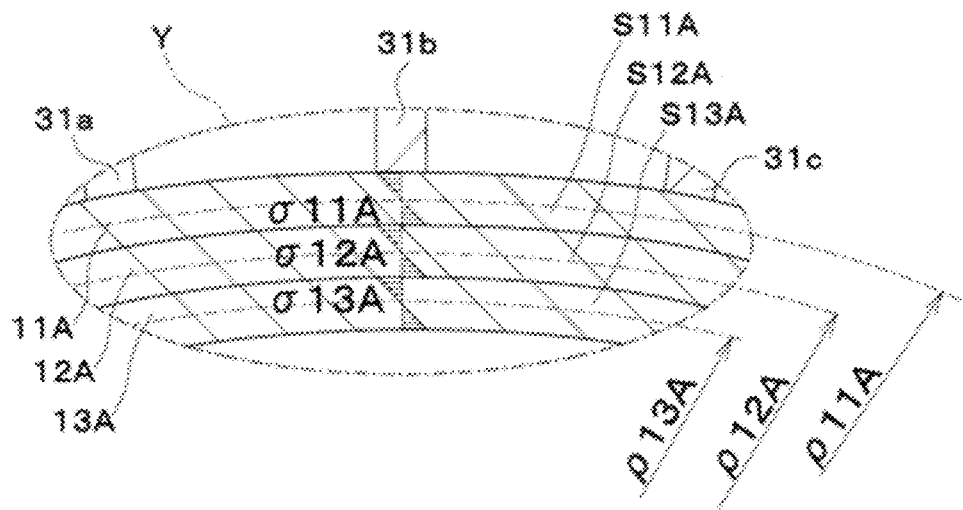
FIG. 5 is an enlarged sectional view illustrating a Y portion in FIG. 3.

As described above, the fixing portion 14 is a cylindrical portion formed by joining the outer peripheral edges of the first thin plate member 11A, the second thin plate member 12A, and the third thin plate member 13A to each other by welding or the like. Outer diameter D14 of the fixing portion 14 defines the diameter of the outer peripheral edge of the diaphragm unit 10A and inner diameter d14 of the fixing portion 14 defines the diameter of the outer peripheral edge of the deformation region of the diaphragm unit 10A. Here, the inner diameter d14 of the fixing portion 14 is desirably set larger than outer diameter D30 of the deformation detection region R to increase the sensor sensitivity. As a result, in the deformation detection region R, the diaphragm unit 10A is formed in the multi-layer structure including the first thin plate member 11A, the second thin plate member 12A, and the third thin plate member 13A. With this structure, in the deformation detection region R of the diaphragm unit 10A, the individual thin film members are independently deformed at a pressure receiving time. Specifically, the first thin plate member 11A, the second thin plate member 12A, and the third thin plate member 13A have neutral surfaces S11A, S12A, and S13A, respectively, and the lower sides thereof (the sides close to the third lower surface 13Ab that functions as the pressure receiving surface) in FIG. 3 and FIG. 5 are deformed with compression stresses and the upper sides thereof (the sides close to the first upper surface 11Aa that functions as the support surface of the sensing unit 30) are deformed with tensile stresses with respect to these neutral surfaces S11A, S12A, and S13A as the borders.

An outer peripheral side wall surface 14a that forms the outer peripheral edge of the fixing portion 14 is inserted into the opening 21 of the housing 20 described later, and then at least part (welded portion W) thereof is joined to the inner peripheral side wall surface 21a of the opening 21 by, for example, welding. As a result, the diaphragm unit 10A is supported by and fixed to the housing 20 via the fixing portion 14 (more specifically, the welded portion W). In this fixation form, when the pressure P of the measurement target fluid F is applied through the third lower surface 13Ab that functions as the pressure receiving surface, the reaction force thereof acts on the housing 20 via the fixing portion 14 (more specifically, the welded portion W).

It should be noted here that the above fixation form of the diaphragm unit 10A is only an example and any fixation form is allowed as long as the housing 20 receives the force acting on the diaphragm unit 10A at a pressure receiving time and the reaction force of this force acts on the outer peripheral edges of the individual thin plate members via the fixing portion 14 of the diaphragm unit 10A. For example, a seating surface in contact with the upper end surface of the fixing portion 14 may be formed in the opening 21 of the housing 20, and the diaphragm unit 10A may be fixed to the housing 20 so that the fixing portion 14 is sandwiched between this seating surface and the snap ring attached to the lower end surface of the fixing portion 14.

<Housing 20>

The housing 20 is a substantially cylindrical diaphragm support element having the opening 21 inside and is made of a metal material with high corrosion resistance, such as stainless steel (SUS). As illustrated in FIG. 1, a ferrule flange portion 20f to be joined to a ferrule flange portion Hf of the pipe H is provided in a lower portion of the housing 20 so as to project radially outward. The pressure sensor 1A and the pipe H are connected to each other by vertically sandwiching the ferrule flange portion 20f and the ferrule flange portion Hf overlapping with each other via the clamp C. The inner peripheral side wall surface 21a of the opening 21 is joined to the outer peripheral edge of the diaphragm unit 10A in the lower portion thereof, and forms a cylindrical space V isolated from the inside of the pipe H through which the measurement target fluid F flows in and out, together with the diaphragm unit 10A (more specifically, the first upper surface 11Aa of the diaphragm unit 10A). This space V communicates with, for example, the atmosphere and has the sensing unit 30 described below inside.

<Sensing Unit 30>

As described above, the sensing unit 30 is a functional unit that detects the deformation of the diaphragm unit 10A and outputs an electric signal (for example, a voltage signal) corresponding to the deformation amount. The sensing unit 30 includes, for example, a plurality of structural bodies 31a, 31b, and 31c erected on the first upper surface 11Aa of the diaphragm unit 10A, and a semiconductor chip 32 supported by these structural bodies 31a, 31b, and 31c. This semiconductor chip 32 includes, for example, a substrate made of a semiconductor material such as Si and a strain gauge having a Wheatstone bridge circuit formed on this substrate. Four resistor elements (for example, diffused resistors) included in the Wheatstone bridge circuit change (expand or contract) in lengths according to the deformation of the diaphragm unit 10A and increase or reduce in resistance values. As a result, the deformation of the diaphragm unit 10A is detected as a change in the voltage value at the midpoint of the Wheatstone bridge circuit.

Although the sensing unit 30 adopts the above structure to achieve low hysteresis and high sensitivity at a higher level by synergistic effects with the prior art in the embodiment, the sensing unit 30 does not necessarily have this structure and may be directly attached to, for example, the first upper surface 11Aa of the first thin plate member 11A.

[Operating Principle of the Pressure Sensor 1A]

The principle (operating principle) of measuring the pressure P of the measurement target fluid F using the pressure sensor 1A with the above structure will be described using the deformation form of the diaphragm unit 10A with reference to FIG. 3 and FIG. 4.

Figure 4:
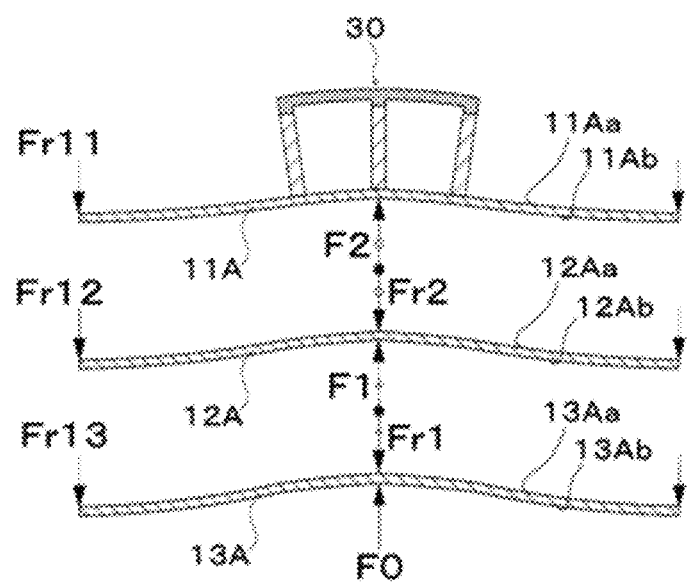
FIG. 4 is a conceptual diagram illustrating the deformation form of the diaphragm unit included in the pressure sensor according to the first embodiment of the present disclosure at a pressure receiving time of the diaphragm unit.

When the diaphragm unit 10A is in the pressure receiving state, as illustrated in FIG. 3 and FIG. 4, a predetermined force F0 (force F0 is displayed as a concentrated load in FIG. 4 for convenience) caused by the equivalent distributed load P is applied to the third lower surface 13Ab of the third thin plate member 13A, which forms the pressure receiving surface, upward. At this time, a downward reaction force Fr13 acts on the outer peripheral edge supported by and fixed to the housing 20 via the fixing portion 14 and the third thin plate member 13A is deformed so that the center portion projects with a bending moment. This deformation is transferred to the second thin plate member 12A through the second lower surface 12Ab in contact with the third upper surface 13Aa and, at the same time, an upward force F1 is transferred from the third thin plate member 13A to the second thin plate member 12A. At this time, a reaction force Fr1 of the force F1 acts downward on the third upper surface 13Aa of the third thin plate member 13A. As a result, the third thin plate member 13A remains stationary in a state in which the upward force F0 is balanced with the downward reaction force Fr1 and the reaction force Fr13. Although the force F1 and the reaction force Fr1 thereof are displayed as concentrated loads for convenience in FIG. 4, these forces are actually transferred by surface contact.

In the second thin plate member 12A to which the upward force F1 is applied through the second lower surface 12Ab in contact with the third upper surface 13Aa of the third thin plate member 13A, a downward reaction force Fr12 acts on the outer peripheral edge fixed to the housing 20 via the fixing portion 14 and the second thin plate member 12A is deformed so that the center portion projects with a bending moment. This deformation is transferred to the first thin plate member 11A through the first lower surface 11Ab in contact with the second upper surface 12Aa and, at the same time, an upward force F2 is transferred from the second thin plate member 12A to the first thin plate member 11A. At this time, a reaction force Fr2 of the force F2 acts downward on the second upper surface 12Aa of the second thin plate member 12A. As a result, the second thin plate member 12A remains stationary in a state in which the upward force F1 is balanced with the downward reaction force Fr2 and the reaction force Fr12. Although the force F2 and the reaction force Fr2 thereof are displayed as concentrated loads for convenience in FIG. 4, these forces are actually transferred by surface contact.

The first thin plate member 11A to which the upward force F2 is applied through the first lower surface 11Ab in contact with the second upper surface 12Aa of the second thin plate member 12A remains stationary since a downward reaction force Fr11 balanced with this force F2 acts on the outer peripheral edge fixed to the housing 20 via the fixing portion 14, and is deformed so that the center portion thereof projects with a bending moment.

The above deformation of the first thin plate member 11A is transferred to the sensing unit 30 attached to the first upper surface 11Aa and deforms the semiconductor chip constituting the sensing unit 30. This displaces (expands or contracts) the resistor elements included in the strain gauge including the Wheatstone bridge circuit in the semiconductor chip 32, and the voltage value corresponding to the deformation (amount) is output from the sensing unit 30.

[Effects]

The effects of the pressure sensor 1A according to the embodiment with the structure described above, specifically, the effects on the pressure resistance performance, the measurement error, and the pressure sensitivity required for the pressure sensor including the diaphragm, will be described with reference to FIG. 3 to FIG. 5 in comparison with the conventional pressure sensor having a single layer diaphragm.

The pressure resistance performance is evaluated by a maximum value σmax of a stress σ (bending stress intensity σ) caused by the bending moment acting on the diaphragm in the pressure receiving state. This maximum stress value σmax is generated at the outer peripheral edge, which is the fixed end, in an aspect in which an equivalent distributed load is applied to a discoid diaphragm whose outer peripheral edge is fixed to the housing by welding or the like. The maximum stress value σmax can be calculated from the relational expression σmax=3P×a²/4t² where P is an equivalent distributed load, a is a radius of the diaphragm, and t is a plate thickness of the diaphragm. The maximum stress value σmax needs to be equal to or less than a specified value to obtain desired pressure resistance performance. For that purpose, it is useful to increase the plate thickness t of the outer peripheral edge (or reduce the diameter with respect to the thickness, that is, the aspect ratio). Accordingly, the plate thickness t of the diaphragm needs to be increased to improve the pressure resistance performance of a diaphragm with a predetermined size (diameter).

The measurement error can be reduced by, for example, suppressing hysteresis with respect to pressure. In order to suppress hysteresis with respect to pressure, it is effective to reduce the amplitude of the stress σ (bending stress intensity σ) and a strain ε (that is, to reduce the maximum stress value σmax and a maximum strain max) in the deformation detection region R in which the sensing unit is provided in the diaphragm that is put in the pressure receiving state and the non-pressure receiving state repeatedly. As described above, the maximum stress value σmax and the maximum strain max are indices representing the degree of measurement error (hysteresis with respect to pressure). In order to reduce the maximum stress value σmax and the maximum strain max, it is useful to increase the rigidity of the deformation region in the diaphragm, that is, to increase the plate thickness t of the diaphragm. Accordingly, the plate thickness t of the diaphragm needs to be increased to suppress the measurement error (hysteresis with respect to pressure).

The pressure sensitivity depends on the deformation amount in the deformation region in the diaphragm in which the sensing unit is arranged, and the pressure sensitivity becomes higher as the ratio of the deformation amount to the pressure change in the measurement target fluid F is larger (that is, as the rigidity of the diaphragm is lower and the diaphragm is bent more). It is useful to reduce the plate thickness t of the diaphragm to reduce the rigidity of the diaphragm. Accordingly, the plate thickness t of the diaphragm needs to be reduced to improve the pressure sensitivity.

As described above, the requirements for the plate thickness t of the diaphragm are contradictory between the pressure resistance performance and the measurement error, and the pressure sensitivity, and the requirements for the rigidity of the diaphragm are contradictory between the measurement error and the pressure sensitivity. In the conventional pressure sensor, the thickness t of the diaphragm is set to a sufficiently large value to guarantee the pressure resistance performance. As a result, as described in BACKGROUND OF THE INVENTION, although the measurement error is reduced because the rigidity of the diaphragm is increased and hysteresis with respect to pressure is suppressed, the pressure sensitivity is reduced because the deformation amount is small. Accordingly, in the conventional pressure sensor, it is necessary to take a technical measure such as separately providing the support member described in patent literature 1 to obtain a desired pressure sensitivity.

In contrast, in the pressure sensor 1A having the diaphragm unit 10A according to the embodiment, since the mechanical properties such as the rigidity of the diaphragm have been reviewed in addition to the technical measures provided in the invention described in the above patent literature 1, the contradictory relationship described above can be improved (solved) at a higher level. That is, as described above, in the diaphragm unit 10A included in the pressure sensor 1A, the deformation region (deformation detection region R) has the multi-layer structure formed by the first thin plate member 11A, the second thin plate member 12A, and the third thin plate member 13A, and the first thin plate member 11A, the second thin plate member 12A, and the third thin plate member 13A are deformed independently of each other in the pressure receiving state described above. Specifically, the first thin plate member 11A, the second thin plate member 12A, and the third thin plate member 13A have the neutral surfaces S11A, S12A, and S13A, respectively, that have different curvature radiuses (curvature radiuses ρ11A, ρ12A, and ρ13A), and the lower sides (the sides close to the third lower surface 13Ab that functions as the pressure receiving surface) in FIG. 3 and FIG. 5 are deformed with the compression stresses and the upper sides (the sides close to the first upper surface 11Aa that functions as the support surface of the sensing unit 30) are deformed with the tensile stresses with respect to these neutral surfaces S11A, S12A, and S13A as the borders (see FIG. 3 and FIG. 5).

Here, stresses σ11A, σ12A, and σ13A (bending stress intensities σ11A, σ12A, and σ13A) caused by the bending moments acting on the first thin plate member 11A, the second thin plate member 12A, and the third thin plate member 13A in the pressure receiving state can be calculated approximately by the relational expression σk=E×zk/ρk (k=11A, 12A, 13A) where a longitudinal elastic modulus is E, the curvature radiuses of the neutral surfaces are ρ11A, ρ12A, and ρ13A, and distances from the neutral surfaces are z11A, z12A, and z13A when these thin plate members are made of the same material. The range of the distance zk from each of the neutral surfaces is defined by the plate thickness tk, and the maximum value of the distance zk is one half the plate thickness tk when the discoid first thin plate member 11A, the discoid second thin plate member 12A, and the discoid third thin plate member 13A have a vertical cross-sectional shape vertically symmetrical and are made of the same material. That is, the stress σk is maximum on the surfaces of the first thin plate member 11A, the second thin plate member 12A, and the third thin plate member 13A, and the maximum value (approximate value) is obtained by σkmax=E×tk/(2×ρk) (referred to below as a "relational expression α").

As described above, σkmax in the relational expression α described above is an index representing the degree of measurement error (hysteresis with respect to pressure) and this value is preferably small. In addition, the curvature radius ρk in the relational expression α described above is an index representing the degree of deformation, that is, an index of the pressure sensitivity. When this value reduces, the degree of deformation increases and is suitable to improve the pressure sensitivity.

Here, when it is assumed that the plate thicknesses t11, t12, and t13 of the first thin plate member 11A, the second thin plate member 12A, and the third thin plate member 13A are one-third the plate thickness t of the single layer diaphragm, as described above, the measurement error (hysteresis with respect to pressure) and the pressure sensitivity of the pressure sensor 1A having the diaphragm unit 10A are superior to those of the conventional pressure sensor having the single layer diaphragm.

That is, if the maximum stress value σmax, which is an index of measurement error (hysteresis with respect to pressure), is the same between the two diaphragms, the curvature radius of the diaphragm unit 10A (more specifically, the curvature radius ρ11A of the first thin plate member 11A on which the sensing unit 30 is provided), which is an index of the pressure sensitivity, is substantially one-third that of the single layer diaphragm based on the relational expression α. Accordingly, when it is assumed that the pressure sensitivity is inversely proportional to the curvature radius, the measurement error (hysteresis with respect to pressure) and the pressure sensitivity of the pressure sensor 1A including the diaphragm unit 10A are identical to and substantially three times those of the conventional pressure sensor with the single layer diaphragm, respectively.

In addition, when the maximum stress value σmax of the diaphragm unit 10A is one-half that of the single layer diaphragm, the curvature radius of the diaphragm unit 10A (more specifically, the curvature radius ρ11A of the first thin plate member 11A on which the sensing unit 30 is provided) is substantially two-thirds that of the single layer diaphragm based on the relational expression α. Accordingly, when it is assumed that the measurement error (hysteresis with respect to pressure) is proportional to the maximum value of the stress σ (bending stress intensity σ) and the pressure sensitivity is inversely proportional to the curvature radius, the measurement error and the pressure sensitivity of the pressure sensor 1A including the diaphragm unit 10A are one-half and substantially one-and-a-half times those of the conventional pressure sensor having the single layer diaphragm, respectively.

As described above, in the pressure sensor 1A including the diaphragm unit 10A with the multi-layer structure including the plurality of thin film members, it is possible to achieve, at a high level, both reduction in the measurement error and improvement of pressure sensitivity, which have been considered to be contradictory (that is, the contradictory relationship with respect to the rigidity of the diaphragm can be improved). This effect is further enhanced by increasing the number of the thin plate members constituting the diaphragm unit 10A and reducing the plate thickness thereof.

In addition, the pressure sensor 1A including the diaphragm unit 10A with the multi-layer structure has an excellent effect about the pressure capacity. That is, the forces illustrated in FIG. 4 act on the diaphragm unit 10A of the multi-layer structure including the first thin plate member 11A, the second thin plate member 12A, and the third thin plate member 13A. Here, the force F1 is equal to the reaction force Fr1 thereof, and the force F2 is equal to the reaction force Fr2 thereof. Based on the expressions for balance of the forces, the force F0 caused by the pressure P of the measurement target fluid F is equal to the total value of the reaction forces Fr11, Fr12, and Fr13 acting on the outer peripheral edges of the first thin plate member 11A, the second thin plate member 12A, and the third thin plate member 13A. That is, since the diaphragm has the multi-layer structure, the force F0 caused by the pressure P of the measurement target fluid F is distributed among the individual layers. As a result, the forces for bending the individual thin plate members are smaller than the force for bending the single-layer diaphragm. For example, in the first thin plate member 11A, this force is reduced by the magnitude of the reaction force Fr1. Accordingly, when the force F0 caused by the pressure P of the measurement target fluid F is the same value, the maximum value σmax of the stress σ (bending stress intensity σ) generated at the outer peripheral edge of the diaphragm unit 10A, more specifically, a maximum value σimax of a stress σi (bending stress intensity σi) (i=11A, 12A, 13A) generated at each of the outer peripheral edges of the first thin plate member 11A, the second thin plate member 12A, and the third thin plate member 13A is smaller than that of the single-layer diaphragm, thereby improving the pressure resistance performance. This effect is enhanced by increasing the number of the thin plate members constituting the diaphragm unit 10A.

Second Embodiment

Next, a pressure sensor 1B according to a second embodiment of the present disclosure will be described. The structure of this pressure sensor 1B is the same as that of the pressure sensor 1A according to the first embodiment except that the diaphragm unit 10A included in the pressure sensor 1A is replaced with a diaphragm unit 10B illustrated in FIG. 6. The structure of the diaphragm unit 10B will be described below.

<Diaphragm Unit 10B>

Figure 6:
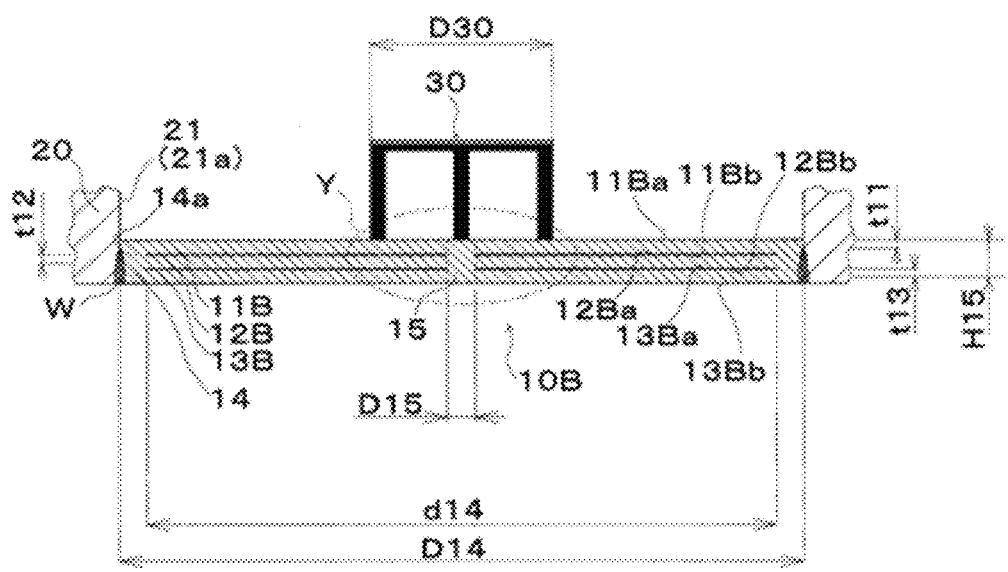
FIG. 6 is an enlarged view illustrating an X portion in FIG. 1 in a cross section of a diaphragm unit included in a pressure sensor according to a second embodiment of the present disclosure.

As illustrated in FIG. 6, the diaphragm unit 10B includes a non-deformed portion 15 that has high rigidity and is provided in the center portion, and a first thin plate member 11B, a second thin plate member 12B, and a third thin plate member 13B that have low rigidity and are provided so as to surround the peripheral edge of this non-deformed portion 15. The first thin plate member 11B, the second thin plate member 12B, and the third thin plate member 13B are formed in cylindrical thin plates, the inner peripheral edges thereof are connected to the outer peripheral edge of the non-deformed portion 15, and the outer peripheral edges thereof are connected to the housing (more specifically, the inner peripheral side wall surface 21a of the opening 21).

The non-deformed portion 15 is formed as a cylindrical region with a diameter of D15 and a height of H15. The non-deformed portion 15 is formed by, for example, joining (for example, joining by welding) the center portions of the first thin plate member 11A, the second thin plate member 12A, and the third thin plate member 13A constituting the diaphragm unit 10A within a predetermined range. In this specification, the height H15 is the total value (that is, H15=t11+t12+t13) of the plate thicknesses of the first thin plate member 11B, the second thin plate member 12B, and the third thin plate member 13B. In addition, the diameter D15 is set to a value smaller than the outer diameter D30 of the deformation detection region R so that the strain gauge constituting the sensing unit 30 can be deformed.

In the diaphragm unit 10B according to the embodiment described above, the non-deformed portion 15 that has high rigidity is supported by and fixed to the housing 20 (more specifically, the inner peripheral side wall surface 21a of the opening 21) via the first thin plate member 11B, the second thin plate member 12B, and the third thin plate member 13B that have low rigidity. Accordingly, when the diaphragm unit 10B according to the embodiment is in the pressure receiving state, the first thin plate member 11B, the second thin plate member 12B, and the third thin plate member 13B that have low rigidity are deformed. Specifically, in the diaphragm unit 10B, the first thin plate member 11B, the second thin plate member 12B, and the third thin plate member 13B are deformed so that the center portion including the non-deformed portion 15 projects.

Figure 7:
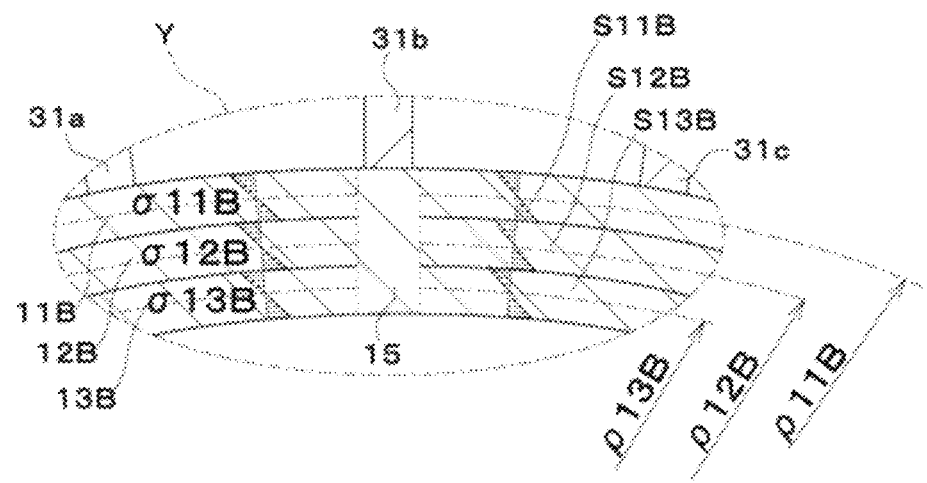
FIG. 7 is an enlarged view illustrating the portion corresponding to a Y portion in FIG. 6 in a cross section of the deformation form of the diaphragm unit included in the pressure sensor according to the second embodiment of the present disclosure at a pressure receiving time of the diaphragm unit.

Since the non-deformed portion 15 is not deformed substantially in the deformation form described above, a stress caused by a bending moment is hardly generated. In contrast, as illustrated in FIG. 7, the first thin plate member 11B, the second thin plate member 12B, and the third thin plate member 13B are deformed with compression stresses or tensile stresses with respect to three neutral surfaces S11B, S12B, and S13B with different curvature radiuses (curvature radiuses ρ11B, ρ12B, and ρ13B) as the borders. As a result, stresses σ11B, σ12B, and σ13B (bending stress intensities σ11B, σ12B, and σ13B) caused by the bending moments are generated inside the first thin plate member 11B, the second thin plate member 12B, and the third thin plate member 13B. As a result, the same effect as the pressure sensor 1A including the diaphragm unit 10A is also obtained in the pressure sensor 1B including the diaphragm unit 10B.

The integrity of the diaphragm unit 10B is enhanced by forming the non-deformed portion 15. That is, the pressure P of the measurement target fluid F is transferred to the individual thin film members because the non-deformed portion 15 forms part of the point of action. This guarantees the stable operation of the pressure sensor 1B. The position and shape of the non-deformed portion 15 are not limited to a particular position or shape as long as the individual thin plate members can be deformed (deflected) independently and the sensing unit 30 can detect the deformation of the diaphragm unit 10B. For example, the non-deformed portion 15 may be disposed outside the deformation detection region R. At this time, the non-deformed portion 15 may be formed in an annular portion or a portion including a plurality of cylinders scattered concentrically.

Third Embodiment

Next, a pressure sensor 1C according to a third embodiment of the present disclosure will be described. The structure of this pressure sensor 1C is the same as that of the pressure sensor 1A according to the first embodiment except that the diaphragm unit 10A included in the pressure sensor 1A is replaced with a diaphragm unit 10C illustrated in FIG. 8. The structure of the diaphragm unit 10C will be described below.

<Diaphragm Unit 10C>

Figure 8:
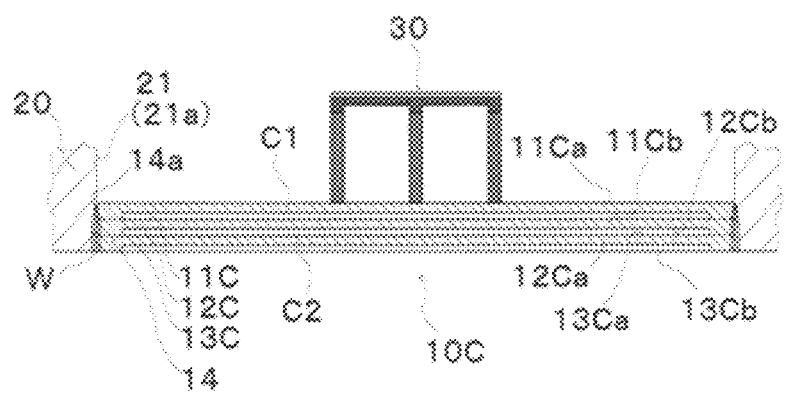
FIG. 8 is a sectional view illustrating a diaphragm unit included in a pressure sensor according to a third embodiment of the present disclosure and enlarges an X portion in FIG. 1.
Figure 9:
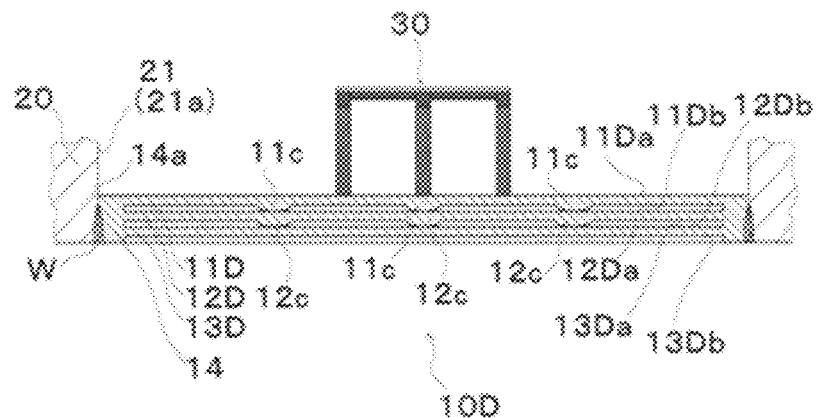
FIG. 9 is a sectional view illustrating a diaphragm unit included in a pressure sensor according to a fourth embodiment of the present disclosure and enlarges an X portion in FIG. 1.
Figure 10:
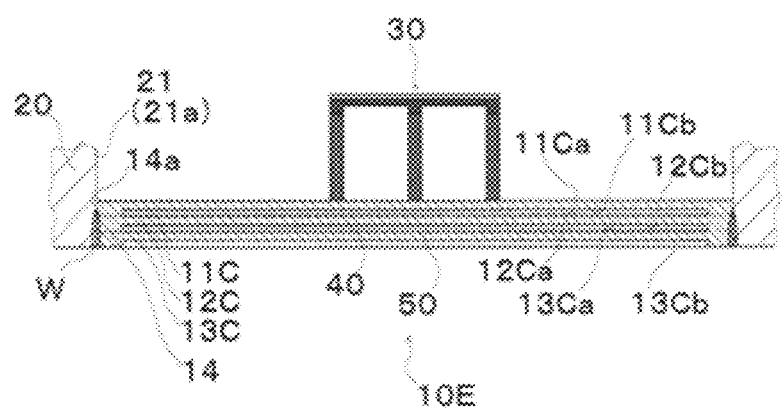
FIG. 10 is a sectional view illustrating a diaphragm unit included in a pressure sensor according to a fifth embodiment of the present disclosure and enlarges an X portion in FIG. 1.

The diaphragm unit 10C has the same basic form as the diaphragm unit 10A, but differs from the diaphragm unit 10A in that, as illustrated in FIG. 8, recesses are formed in the lower surfaces of a first thin plate member 11C and a second thin plate member 12C constituting the diaphragm unit 10C, that is, a first lower surface 11Cb and a second lower surface 12Cb. Since the recesses are formed, spaces C1 and C2 are formed between two adjacent thin plate members, that is, between the first thin plate member 11C and the second thin plate member 12C, and between the second thin plate member 12C and a third thin plate member 13C, respectively.

Since the spaces C1 and C2 are formed, the first thin plate member 11C, the second thin plate member 12C, and the third thin plate member 13C are physically prevented from being crimped to each other. Specifically, since the region in which these members are in press-contact to each other at a pressure receiving time is suppressed to the required minimum region (for example, the deformation detection region R in which the sensing unit 30 is disposed), the plurality of members can be prevented from being deformed integrally (the individual thin plate members can be deformed (deflected) independently). In addition, since the differences in the deformation forms of the thin film members caused by differences in the materials of the first thin plate member 11C, the second thin plate member 12C, and the third thin plate member 13C (for example, differences in the deformation forms caused by differences in the longitudinal elastic modulus and differences in the deformation forms of the thin film members caused by differences in the thermal expansion) are absorbed by the spaces C1 and C2, interferences between the individual thin plate members caused by deformation can be suppressed.

It should be noted here that the portions in which the recesses are formed and the forms of formation can be changed as appropriate. For example, the recesses described above may be formed in a second upper surface 12Ca of the second thin plate member 12C and a third upper surface 13Ca of the third thin plate member 13C instead of the first lower surface 11Cb of the first thin plate member 11C and the second lower surface 12Cb of the second thin plate member 12C. Alternatively, the recesses (spaces C1 and C2) described above may be formed by inserting annular spacers between the first thin plate member 11C, the second thin plate member 12C, and the third thin plate member 13C, which are made from thin flat plates without recesses.

Fourth Embodiment

Next, a pressure sensor 1D according to a fourth embodiment of the present disclosure will be described. The structure of this pressure sensor 1D is the same as that of the pressure sensor 1A according to the first embodiment except that the diaphragm unit 10A included in the pressure sensor 1A is replaced with a diaphragm unit 10D illustrated in FIG. 9. The structure of the diaphragm unit 10D will be described below.

<Diaphragm Unit 10D>

The structure of the diaphragm unit 10D is the same as that of the diaphragm unit 10A except that a convex portion 11c is provided on a first lower surface 11Db of a first thin plate member 11D and a convex portion 12c is provided on a second lower surface 12Db of a second thin plate member 12D.

The convex portion 11c and the convex portion 12c are made of the same material as in the first thin plate member 11D and the second thin plate member 12D, and are formed on the surfaces of the individual thin plate members by microfabrication such as photolithography or film formation such as vapor deposition. However, the material of the convex portion 11c and the convex portion 12c is not limited to the material described above. For example, the convex portions 11c and 12c may be made of a lubricant polymeric material.

The convex portion 11c and the convex portion 12c are, for example, domical and are disposed at the center portions of the first lower surface 11Db and the second lower surface 12Db and at four positions concentrically arranged at intervals of substantially 90°. In addition, the convex portion 11c and the convex portion 12c are disposed so as to be vertically aligned with each other. It should be noted here that the shapes of the convex portion 11c and the convex portion 12c are not limited to particular shapes. For example, the shapes of the convex portions 11c and 12c may be columns (cylinder or rectangular-column) or frustums (truncated cones or truncated pyramids). In addition, the number and the positions of the convex portions 11c and the convex portions 12c are not limited to a particular number or particular positions. For example, one convex portion 11c and one convex portion 12c may be disposed in the central portions or a plurality of convex portions 11c and a plurality of convex portions 12c may be disposed between the central portions and the outer peripheral edges. When a plurality of convex portions 11c and a plurality of convex portions 12c are disposed, these convex portions may be disposed regularly or randomly.

Alternatively, the convex portions 11c and 12c may be provided so as to project from the upper surfaces of the second thin plate member 12D and a third thin plate member 13D constituting the diaphragm unit 10D. Alternatively, the convex portions 11c and 12c provided so as to project from the lower surfaces of the first thin plate member 11D and the second thin plate member 12D and the convex portions 11c and 12c provided so as to project from the upper surfaces of the second thin plate member 12D and the third thin plate member 13D may be mixed with each other.

In the diaphragm unit 10D provided with the convex portions 11c and the convex portions 12c, the contact areas between the adjacent thin plate members (the first thin plate member 11D and the second thin plate member 12D, and the second thin plate member 12D and the third thin plate member 13D) become smaller. This can preferably prevent, at a pressure receiving time, adjacent thin plate members, specifically, the first thin plate member 11D and the second thin plate member 12D, and the second thin plate member 12D and the third thin plate member 13D, from being crimped and deformed integrally. That is, the first thin plate member 11D, the second thin plate member 12D, and the third thin plate member 13D can be easily deformed independently of each other.

Fifth Embodiment

Next, a pressure sensor 1E according to a fifth embodiment of the present disclosure will be described. The structure of this pressure sensor 1E is the same as that of the pressure sensor 1A according to the first embodiment except that the diaphragm unit 10A included in the pressure sensor 1A is replaced with a diaphragm unit 10E illustrated in FIG. 10. The structure of the diaphragm unit 10E will be described below.

<Diaphragm Unit 10E>

The structure of the diaphragm unit 10E is the same as that of the diaphragm unit 10C except that lubrication members 40 and 50 are disposed between the first thin plate member 11C and the second thin plate member 12C and between the second thin plate member 12C and the third thin plate member 13C, respectively.

The lubrication members 40 and 50 are preferably made of a polymer material having small surface free energy, for example, fluororesin. In addition, the lubrication members 40 and 50 are preferably flexible materials to suppress, as much as possible, an increase in the rigidity of the diaphragm unit 10C because of the disposition of these members.

The lubrication members 40 and 50 only need to be disposed in a portion (center portion in FIG. 10) in which the adjacent thin plate members come into press-contact to each other at a pressure receiving time below the region in which the sensing unit 30 is disposed. In other words, the lubrication members 40 and 50 do not need to be disposed so as to cover all of a pair of facing surfaces among the adjacent thin plate members.

The diaphragm unit 10E with the structure described above can preferably prevent the adjacent thin plate members (the first thin plate member 11C and the second thin plate member 12C, and the second thin plate member 12C and the third thin plate member 13C) from being attached or crimped regardless of whether the pressure receiving state or the non-pressure receiving state is entered. As a result, it is possible to preferably prevent the first thin plate member 11C, the second thin plate member 12C, and the third thin plate member 13C in the pressure receiving state from being deformed (deflected) integrally. That is, the first thin plate member 11C, the second thin plate member 12C, and the third thin plate member 13C in the pressure receiving state can be easily deformed independently of each other.

Although embodiments according to the present disclosure have been described above, the present disclosure is not limited to these embodiments and various changes can be made without departing from the spirit of the present disclosure. In addition, even if the structure is not described directly in the specification and the drawings, the structure falls within the scope of the technical concept of the present disclosure as long as the operation and effect of the present disclosure are obtained. In addition, the embodiments indicated in the above description and drawings can be combined with each other as long as there is no contradiction in their purposes and structures.

For example, the semiconductor chip 32 including a strain gauge is used as the pressure detection method (sensing principle) via the deformation of a diaphragm in the embodiments described above, but the present disclosure is not limited to this example and a pressure detection method (sensing principle) using, for example, a film formed by, for example, sputtering of a capacitance sensor, a metal strain gauge, or a resistance gauge may be used.

DESCRIPTION OF REFERENCE NUMERALS AND SIGNS 1A, 1B, 1C, 1D, 1E: pressure sensor, 10A, 10B, 10C, 10D, 10E: diaphragm unit, 11A, 11B, 11C, 11D: first thin plate member, 11Aa, 11Ba, 11Ca, 11Da: first upper surface, 11Ab, 11Bb, 11Cb, 11Db: first lower surface, 11c: convex portion, 12A, 12B, 12C, 12D: second thin plate member, 12Aa, 12Ba, 12Ca, 12Da: second upper surface, 12Ab, 12Bb, 12Cb, 12Db: second lower surface, 12c: convex portion, 13A, 13B, 13C, 13D: third thin plate member, 13Aa, 13Ba, 13Ca, 13Da: third upper surface, 13Ab, 13Bb, 13Cb, 13Db: third lower surface, 14: fixing portion, 20: housing, 21: opening, 30: sensing unit, 40, 50: lubrication member

The invention claimed is:

1. A pressure sensor comprising:
a diaphragm unit having a first main surface configured to receive a pressure of a measurement target fluid and a second main surface located on an opposite side of the first main surface;
a housing that supports the diaphragm unit; and
a sensing unit that is provided on the second main surface of the diaphragm unit and configured to output deformation of the diaphragm unit as an electric signal;
wherein at least part of the diaphragm unit has a multilayer structure in which a plurality of thin plate members are stacked, and the plurality of thin plate members are configured to be deformed independently of each other while at least part of the plurality of thin plate members is in press-contact to each other in a pressure receiving state in which the pressure of the measurement target fluid is applied to the first main surface.

2. The pressure sensor according to claim 1,
wherein outer peripheral edges of the plurality of thin plate members are supported by the housing or adjacent thin plate members of the plurality of thin plate members so that the plurality of thin plate members are configured to receive a reaction force caused by the pressure via the outer peripheral edges when the plurality of thin plate members are in the pressure receiving state.

3. The pressure sensor according to claim 2,
wherein at least part of the plurality of thin plate members is joined to each other via the outer peripheral edges and at least part of the joined outer peripheral edges is fixed to the housing.

4. The pressure sensor according to claim 3,
wherein a pair of facing surfaces of two adjacent thin plate members of the plurality of thin plate members are formed so as to be in contact with each other.

5. The pressure sensor according to claim 3,
wherein a space is formed between at least part of adjacent thin plate members of the plurality of thin plate members.

6. The pressure sensor according to claim 5,
wherein a convex portion is provided on at least one of front and back surfaces of at least part of the plurality of thin plate members.

7. The pressure sensor according to claim 5,
wherein a lubrication member is provided between two adjacent thin plate members of the plurality of thin plate members.

8. The pressure sensor according to claim 3,
wherein center portions of the plurality of thin plate members are joined to each other.

9. The pressure sensor according to claim 2,
wherein a pair of facing surfaces of two adjacent thin plate members of the plurality of thin plate members are formed so as to be in contact with each other.

10. The pressure sensor according to claim 2,
wherein a space is formed between at least part of adjacent thin plate members of the plurality of thin plate members.

11. The pressure sensor according to claim 10,
wherein a convex portion is provided on at least one of front and back surfaces of at least part of the plurality of thin plate members.

12. The pressure sensor according to claim 10,
wherein a lubrication member is provided between two adjacent thin plate members of the plurality of thin plate members.

13. The pressure sensor according to claim 2,
wherein center portions of the plurality of thin plate members are joined to each other.

14. The pressure sensor according to claim 2,
wherein the adjacent thin plate members are made of materials different from each other.

15. The pressure sensor according to claim 1,
wherein a pair of facing surfaces of two adjacent thin plate members of the plurality of thin plate members are formed so as to be in contact with each other.

16. The pressure sensor according to claim 1,
wherein a space is formed between at least part of adjacent thin plate members of the plurality of thin plate members.

17. The pressure sensor according to claim 16,
wherein a convex portion is provided on at least one of front and back surfaces of at least part of the plurality of thin plate members.

18. The pressure sensor according to claim 16,
wherein a lubrication member is provided between two adjacent thin plate members of the plurality of thin plate members.

19. The pressure sensor according to claim 1,
wherein center portions of the plurality of thin plate members are joined to each other.

20. The pressure sensor according to claim 1,
wherein the adjacent thin plate members are made of materials different from each other.

* * * * *